United States Patent [19]

Kobayashi

[11] Patent Number: 4,710,965
[45] Date of Patent: Dec. 1, 1987

[54] IMAGE DATA MASKING DEVICE

[75] Inventor: Kiyohiko Kobayashi, Yamato, Japan

[73] Assignee: Ricoh Company, Ltd., Tokyo, Japan

[21] Appl. No.: 759,323

[22] Filed: Jul. 26, 1985

[30] Foreign Application Priority Data

Jul. 30, 1984 [JP] Japan ................ 59-160020

[51] Int. Cl.$^4$ ................ G06K 9/36
[52] U.S. Cl. ................ 382/41; 382/27; 382/49; 382/54
[58] Field of Search ................ 382/54, 27, 41, 49, 382/67, 66

[56] References Cited

U.S. PATENT DOCUMENTS

| | | | |
|---|---|---|---|
| 4,142,246 | 2/1979 | Fumihiko | 364/900 |
| 4,414,685 | 11/1983 | Sternberg | 382/27 |
| 4,443,855 | 4/1984 | Bishop et al. | 382/54 |
| 4,446,459 | 5/1984 | Bond, Jr. et al. | 364/900 |
| 4,597,009 | 1/1986 | Ballmer et al. | 382/52 |
| 4,610,026 | 9/1986 | Tabata et al. | 382/54 |

Primary Examiner—Leo H. Boudreau
Assistant Examiner—Jose L. Couso
Attorney, Agent, or Firm—Oblon, Fisher, Spivak, McClelland, & Maier

[57] ABSTRACT

A device for masking video data for character recognition, pattern recognition and other applications is disclosed. Pixel data stored in an image memory are two-dimensionally accessed by an X direction counter and a Y direction counter. At each time of access, pixel data read out are serially shifted by a first shift register which comprises flip-flops. Outputs of the first shift register are shifted by second shift registers which also comprise flip-flops, in synchronism with the first one of memory read signals.

4 Claims, 8 Drawing Figures

Fig. 5A  $C_8$  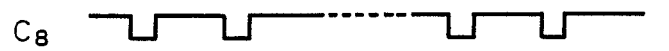
Fig. 5B  $C_9$  
Fig. 5C  R  
Fig. 6
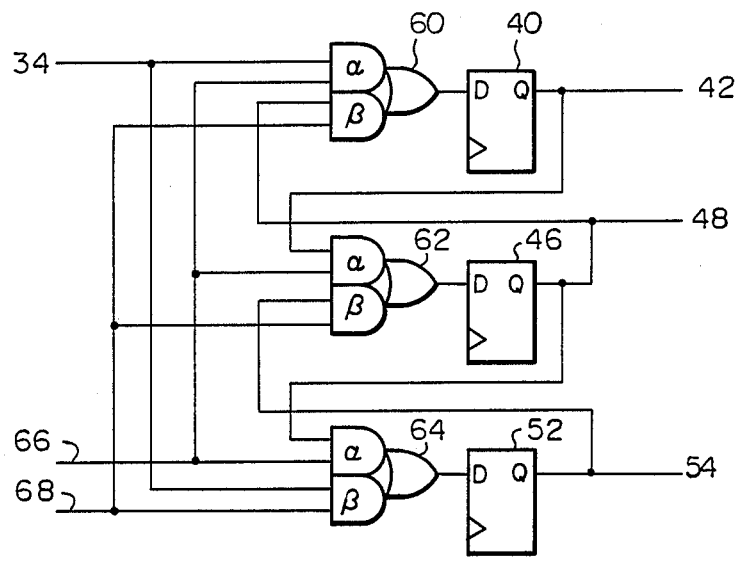

IMAGE DATA MASKING DEVICE

BACKGROUND OF THE INVENTION

The present invention relates to a device for masking image data and, more particularly, to an image data masking device which is capable of omitting a considerable part of hardware and increasing processing rate.

In image processing inclusive of character recognition and pattern recognition, image data are usually masked with a 3×3 or 5×5 matrix on a raster scan basis for removing noise, identifying contours, and other purposes.

While some masking approaches have heretofore been proposed, all of them have had many problems left unsolved such as low processing rates, intricate constructions and disproportionate number of structural elements.

SUMMARY OF THE INVENTION

It is therefore an object of the present invention to solve the problems particular to the prior art approaches as discussed above and provide an image data masking device capable of omitting a substantial number of structural elements and enhancing the processing rate.

It is another object of the present invention to provide a generally improved image data masking device.

A masking device for masking pixel data on the basis of (2n+1)+(2n+1) pixels (where n is a positive integer and where n=1 for a 3×3 matrix) of the present invention comprises an image memory for storing the pixel data, an accessing circuit for two-dimensionally accessing the pixel data stored in the image memory, a first shift register for serially shifting (2n+1) pixel data read out of the image memory at each time of accessing, and "2n" second shift registers for shifting outputs of the first shift register in synchronism with a first one of memory read signals.

In accordance with the present invention, a device for masking image data for character recognition, pattern recognition and other applications is disclosed. Pixel data stored in an image memory are two-dimensionally accessed by an X direction counter and a Y direction counter. At each time of access, pixel data read out are serially shifted by a first shift register which comprises flip-flops. Outputs of the first shift register are shifted by second shift registers which also comprise flip-flops, in synchronism with the first one of memory read signals.

The above and other objects, features and advantages of the present invention will become more apparent from the following detailed description taken with the accompanying drawings.

BRIEF DESCRIPTION OF THE DRAWINGS

FIGS. 5A–5C are timing charts demonstrating the operation of the masking circuit of FIG. 3; and FIG. 6 is a fragmentary view of another embodiment of the present invention.

DESCRIPTION OF THE PREFERRED EMBODIMENTS

While the image data masking device of the present invention is susceptible of numerous physical embodiments, depending upon the environment and requirements of use, substantial numbers of the herein shown and described embodiments have been made, tested and used, and all have performed in an eminently satisfactory manner.

To better understand the present invention, a brief reference will be made to prior art image data masking methods, shown in FIGS. 1 and 2.

Figure 1:
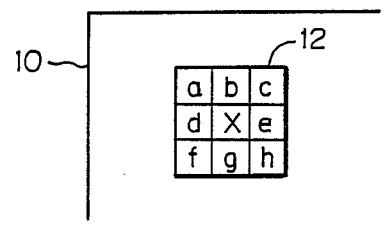
FIGS. 1 and 2 are schematic diagrams representative of prior art image data masking methods.
Figure 2:
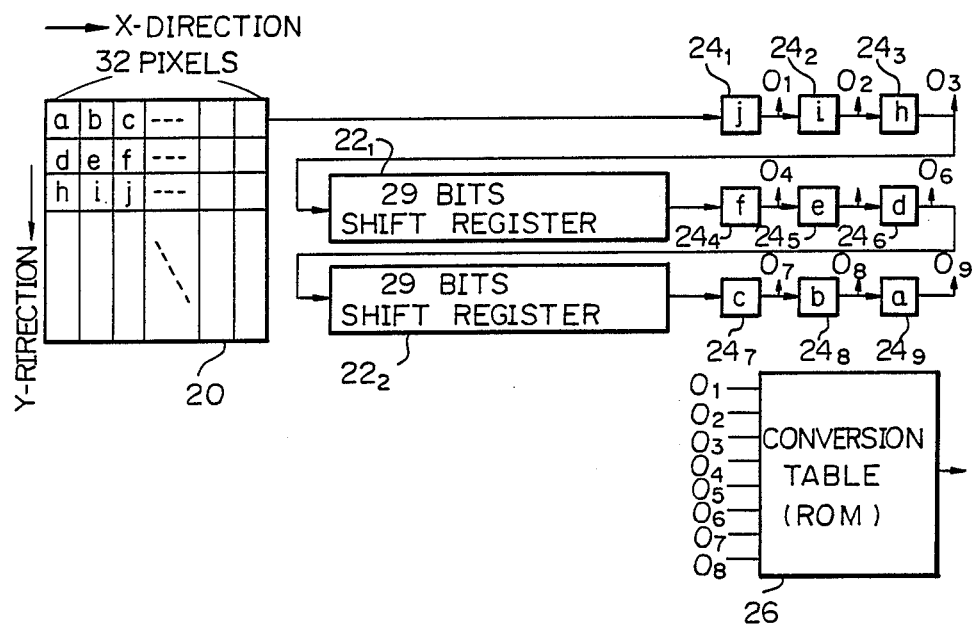

Generally, two different masking methods are known in the art, one shown in FIG. 1 and the other shown in FIG. 2. The method shown in FIG. 1 uses an image memory 10 having, for example, 32×32 pixels or 64×64 pixels in total and contemplates a 3×3 pixel submatrix 12 having any desired reference pixel x at the center thereof. Eight pixels, a, b, c, . . . , h around the reference pixel x are read and subjected to predetermined processing and, then, the reference pixel is shifted to the adjacent pixel e to read the eight pixels which surround the pixel e. Such a procedure is repeated on all the pixels of the image memory 10. The drawback particular to the method shown in FIG. 1 is that a disproportionate processing time is required because eight consecutive times of reading are repeated on each of the 32×32 or 64×64 pixels of the image memory 10.

The other prior art method as shown in FIG. 2 uses two shift registers, nine 1-bit registers, and a conversion table (read only memory or ROM) in order to sequentially shift and read 3×3 pixels by means of hardware. Specifically, an image memory 20 which has 32×32 pixels is sequentially read pixel by pixel in an X direction as a, b, c . . . , while the resulting data are loaded in 29-bit shift registers $22_1$ and $22_2$. Then, pixels d, e, f, . . . in the next row are sequentially read. After the repetition of such a procedure, the pixels a, b, c, . . . h, i, j become stored in 1-bit registers $24_1$–$24_9$ adapted for 3×3 masking at the sixty-seventh time (32×2+3). At this instant, outputs $O_1$–$O_4$ of the 1-bit registers $24_1$–$24_4$ and outputs $O_6$–$O_9$ of the 1-bit registers $24_6$–$24_9$ are picked up and applied to inputs of a conversion table (ROM) 26 so as to read data out of the conversion table 26 with the register outputs used as an address. For example, in preprocessing adapted for noise removal, assuming that even through the center pixel of a 3×3 pixel submatrix is a (logical) "1 (black)", it is regarded as a "0 (white)" if six pixels out of eight pixels which surround the center pixel are "0 (white)", the conversion table 26 will produce an output "0" (center pixel) when the inputs thereto $O_1$–$O_4$ and $O_6$–$O_9$ are "00011000". In FIG. 2, sequentially reading the next pixels and loading them in the shift register $22_1$ and $22_2$ will cause the 3×3 mask to sequentially move in the image memory 20 in the X direction. The method shown in FIG. 2 is disadvantageous in that the shift registers $22_1$ and $22_2$ need to be implemented with a substantial number of parts; the parts reach a prohibitive number as the capacity of the image memory 20 is increased to 64×64 pixels, 128×128 pixels, and so on.

Figure 3:
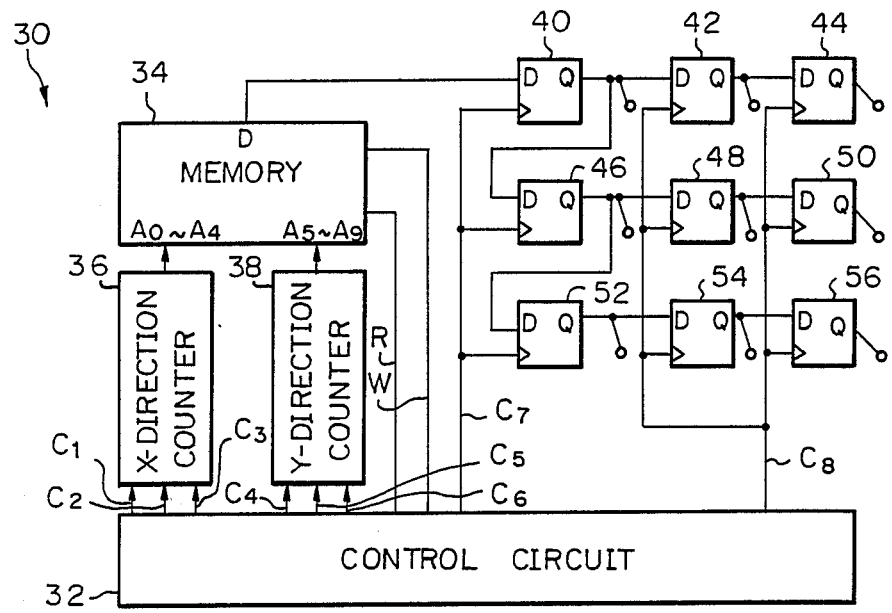
FIG. 3 is a block diagram of a 3×3 submatrix type masking circuit representative of a preferred embodiment of the image data masking device of the present invention.
Figure 4:
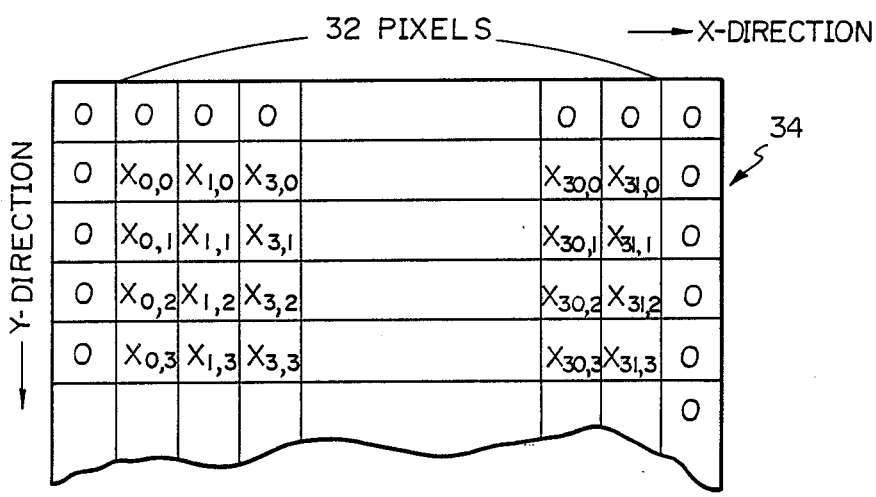
FIG. 4 shows an arrangement of pixels in an image memory included in the masking circuit of FIG. 3.

Referring to FIG. 3, a 3×3 masking circuit in accordance with a preferred embodiment of the present invention is shown and generally designated by the reference numeral 30. The masking circuit 30 comprises a control circuit 32 which is implemented by a microprocessor, an image memory 34, two counters 36 and 38, nine flip-flops 40, 42, 44, 46, 48, 50, 52, 54 and 56 which constitute a shift register in combination. The control circuit, or controller, 32 delivers control signals $C_1$–$C_3$ to the counter 36, control signals $C_4$–$C_6$ to the counter 38, a read signal R and a write signal W to the image memory 34, and control signals $C_7$ and $C_8$ to the flip-flops. The control signals $C_1$ and $C_4$ serve as initializing or counter clear signals, the control signals $C_2$ and $C_5$ serve as increment signals, and the control signals $C_3$ and $C_6$ serve as decrement signals. Pixels in the image memory 34 are arranged as shown in FIG. 4. The counter 36 is adapted to count the image memory 34 in an X direction as shown in FIG. 4, while the counter 38 counts it in a Y direction. Inputs to the image memory 34 are labeled $A_0$–$A_4$ and $A_5$–$A_9$ which respectively indicate positions (addresses) in the X and Y directions. The image memory 34 delivers a particular pixel designated by those addresses from its output terminal D to the D-type flip-flops. Each of the flip-flops sets a signal at its D input timed to a positive-going edge of the control signal $C_7$ or $C_8$.

As shown in FIG. 4, the image memory 34 in practice is provided with two rows of areas each storing a "0 (white)", one above the 32×32 pixel matrix and the other below the same matrix, and two columns of such areas, one at right of the same matrix and the other at left of the same matrix. Hence, 34×34 pixels of data in total are read out of the image memory 34. First, the 3×3 submatrix having a pixel $x_{0,0}$ at the center is read by the following procedure. The counters 36 and 38 respectively are cleared by the signals $C_1$ and $C_4$ while, at the same time, the read signal R is turned to a "1" to read a "0" out of the image memory 34 through the D terminal. Then, the counter 38 is incremented by one by the control signal $C_5$ to read out a "0", and then the counter 38 is further incremented by one by the control signal $C_5$ to read a "0". As a result, the three pixels in the first column in the X direction are read as "0, 0, 0".

The operation of the masking circuit of FIG. 3 is represented by timing charts in FIGS. 5A–5C. As shown, every time a pixel is read out of the image memory 34 responsive to the read signal R, a signal $C_7$ is applied to the flip-flops 40, 46 and 52, which consitute the first column, with the result that three pixels in the Y direction are loaded therein. Each time three pixels in the Y direction are read, a signal $C_8$ is fed to the flip-flops 42, 48 and 54 which constitute the second column and the flip-flops 44, 50 and 56 which constitute the third column, thereby sequentially shifting the data.

To read out the three pixels in the second column out of the initial 3×3 submatrix, the counter 36 is incremented by one and, at the same time, the counter 38 is decremented by two, that is, the signal $C_6$ is sent twice to the counter 38, thereby designating the top pixel "0". Then, the signal $C_5$ is fed once to the counter 38 to designate the intermediate pixel $x_{0,0}$, and then the signal $C_5$ is fed once to the counter 38 to designate the bottom pixel $x_{0,1}$. The data 0, $x_{0,0}$ and $x_{0,1}$ read out of the second column are loaded in the flip-flops 52, 46 and 40, while the data 0, 0 and 0 previously read out of the first column are shifted to the flip-flops 54, 48 and 42.

To read three pixels in the third column of the submatrix, the counter 36 is incremented by one and the counter 38 is decremented by two. Thereafter, the counter 38 is incremented twice in the above-described manner. Pixel data 0, $x_{1,0}$ and $x_{1,1}$ read out of the third column are set in the flip-flops 52, 46 and 40, while the pixel data 0, $x_{0,0}$ and $x_{0,1}$ associated with the second column are shifted to the flip-flops 54, 48 and 42 and the pixel data 0, 0 and 0 associated with the first column to the flip-flops 56, 50 and 44. After the pixel data in the 3×3 submatrix have been fully loaded in the nine flip-flops 40–56, they are produced from output terminals to be processed with, for example, the conversion table (ROM) 26 as shown in FIG. 2. Another 3×3 submatrix adjacent to the above-described submatrix is read by incrementing by one in the X direction and then performing the previously described procedure; the submatrix having the pixel $x_{1,0}$ at the center will be loaded in the flip-flops 40–56.

The above procedure is repeated down to the 3×3 submatrix whose center pixel is $x_{31,0}$. Thereafter, the control circuit 32 returns the processing to the first column in the image memory 34 (clears the counter 36) and starts it again on a 3×3 submatrix which is deviated one row in the Y direction from the first submatrix, that is, it reads the 3×3 submatrix having the pixel $x_{0,1}$ at the center.

Referring to FIG. 6, a masking circuit in accordance with another embodiment of the present invention is shown in a fragmentary diagram. In the particular embodiment shown in FIG. 3, all the signals $C_1$–$C_8$, R and W generated by the controlcircuit 32 are provided by a microprocessor which executes a program. Regarding the method of FIG. 3, since the shift of any column in a 3×3 column to the next is accomplished by delivering the signal $C_6$ twice to the counter 38 to decrement it by two pixels, two consecutive commands have to be executed consuming an extra period of time associated with one command. The embodiment shown in FIG. 6 is constructed to eliminate such a shortcoming.

In FIG. 6, logic gates 60, 62 and 64 are shown which respectively are inserted between the flip-flops 40, 46, and 52 shown in FIG. 3 and the image memory 34. Specifically, in this particular embodiment, a 3×3 submatrix in the image memory 34 of FIG. 4 is read by designating the first column from top to bottom, then the second column from bottom to top, and then the third column from top to bottom. Such a zig-zag reading mode eliminates the need for the commands for decrementing the counter 38 by two and correspondingly speeds up the processing. In accordance with the method represented by FIG. 6, the flow of data which are shifted between the flip-flops is controlled by the signals $C_5$ and $C_6$ which are adapted to increment and decrement the counter 38. For example, after pixels in the second column in FIG. 4 have been accessed in the Y direction as 0, $x_{0,0}$ and $x_{0,1}$, the counter 36 is incremented by one to read $x_{1,1}$ in the second row, then the counter 38 is decremented by one to read $x_{1,0}$, and then the counter 38 is decremented by one to read 0, thereby fully reading the third column.

In FIG. 6, a line 66 is coupled to the signal $C_5$ adapted to increment the counter 38 so that it becomes a "1" as the signal $C_5$ becomes a "1". A line 68 is coupled to the signal $C_6$ adapted to decrement the counter 38 so as to turn to a "1" responsive to a "1" of the signal $C_6$. In this construction, since the pixels 0, $x_{0,0}$ and $x_{0,1}$ in the second column of FIG. 4 are accessed by feeding the signal $C_5$ twice to the counter 38 as previously mentioned, the signal 66 in FIG. 6 becomes a "1" to enable AND gates α of the logic gates 60, 62 and 64. As a result, the data 0, $x_{0,0}$ and $x_{0,1}$ read through the D terminal of the image memory 34 are applied to the flip-flops 52, 46 and 40 via the AND gates α of the logic gates 60, 62 and 64, respectively. Next, while the pixels $x_{1,1}$, $X_{1,0}$ and 0 in the third column are accessed from bottom to top in the Y direction, the signal $C_6$ is delivered twice to the counter 38 and, hence, the signal 68 shown in FIG. 6 becomes a "1" to enable AND gates β of the logic gates 60, 62 and 64. This allows the data $x_{1,1}$, $x_{1,0}$ and 0 read out of the image memory 34 to pass through the AND gates β of the logic gates 64, 62 and 60 to be loaded in the flip-flops 40, 46 and 52, respectively. The positions where such data are loaded in the flip-flops are exactly the same as in FIG. 3.

As described above, the illustrative embodiments shown in FIGS. 3 and 6 can be implemented with a far smaller number of parts than the prior art shown in FIG. 1 and can operate 8/3 times, i.e., about three times faster than the prior art shown in FIG. 2.

In summary, it will be seen that the present invention provides an image data masking device which reduces the number of necessary structural elements and improves the processing rate over the prior art devices. Such a device of the present invention is effectively applicable to a masking circuit using a 5×5 submatrix, not to speak of a 3×3 matrix.

Various modifications will become possible for those skilled in the art after receiving the teachings of the present disclosure without departing from the scope thereof.

What is claimed is:

1. A masking device for masking pixel data on the basis of (2n+1)×(2n+1) pixels, where n is a positive integer, comprising:
an image memory for storing the pixel data;
accessing means for directly accessing in two dimensions the pixel data stored in said image memory, said accessing means including an X direction address means and a Y direction address means for determining the location of said pixel data;
first shift register means for directly receiving (2n+1) pixel data read out of said image memory and for serially shifting said pixel data at each time of accessing, each stage of said first shift register means being connected to a gate means including a first AND gate, a second AND gate and an OR gate with the outputs of said first AND gate and said second AND gate forming the inputs of said OR gate and the output of said OR gate forming the input to the stage, said AND gates being connected to said memory so that said pixel data may be received at either end of said first shift register means; and
2n second shift register means connected sequentially to said first shift register for shifting in parallel said pixel data from said first shift register means in synchronism.

2. A masking device as claimed in claim 1, wherein the X direction address means comprises an X direction address counter for counting the image memory in an X direction and the Y direction address counter means comprises a Y direction address counter for counting the image memory in a Y direction.

3. A masking device as claimed in claim 2, wherein each of the first and second shift register means comprises flip-flops.

4. A masking device as claimed in claim 2, wherein the first shift register means is constructed to control a data shifting direction responsive to an increment signal and a decrement signal associated with the Y direction address counter.

* * * * *